April 15, 1930.  F. C. RALPH ET AL  1,754,864
BIRD TRAP
Filed July 13, 1928   2 Sheets-Sheet 1
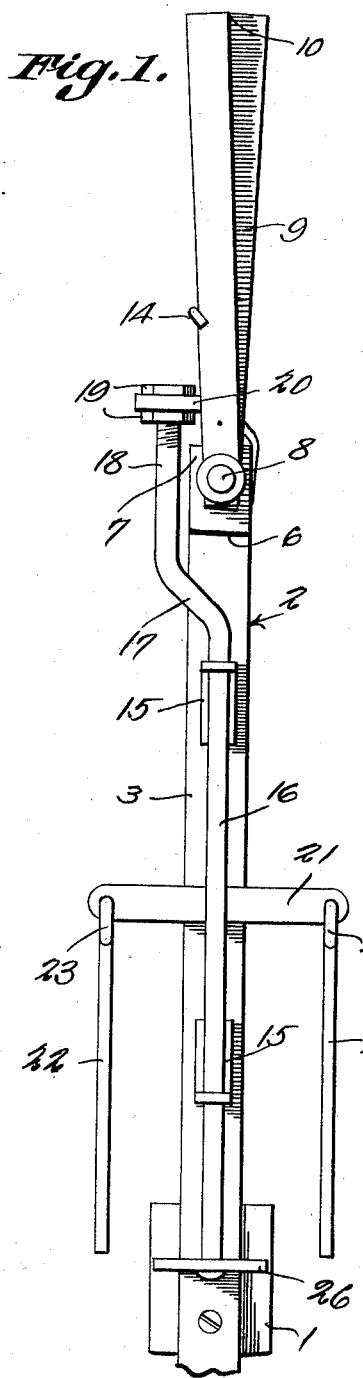
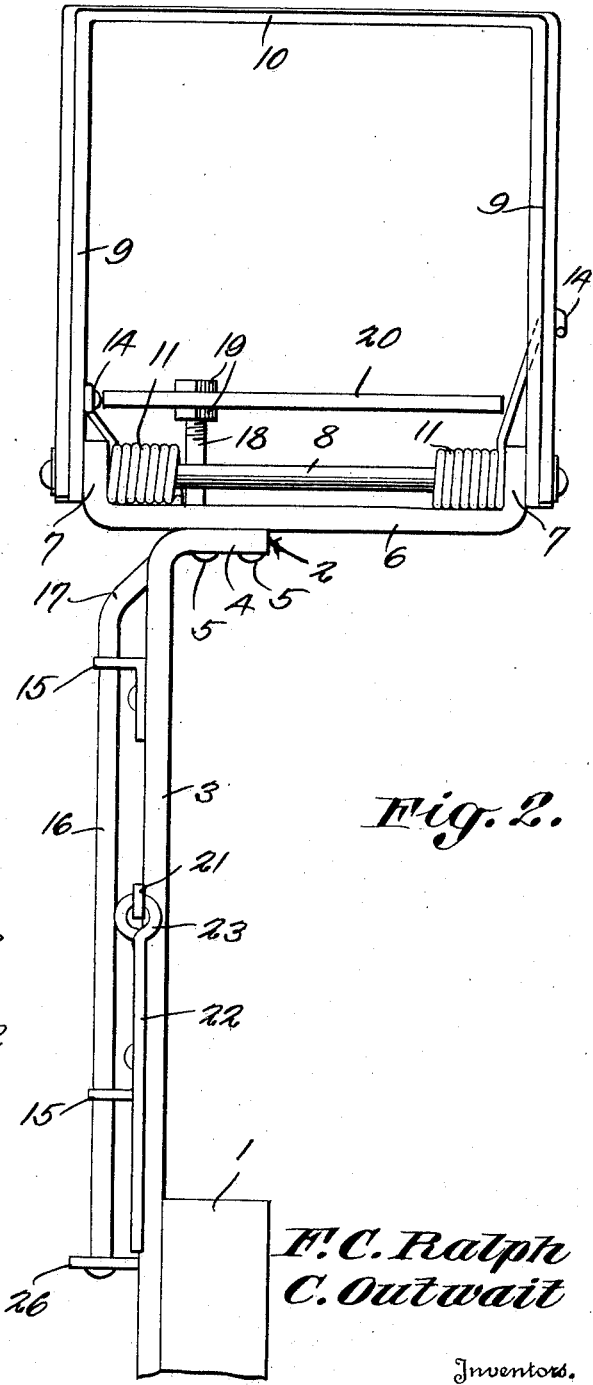
F. C. Ralph
C. Outwait
Inventors.
By C. A. Snow & Co.
Attorneys.

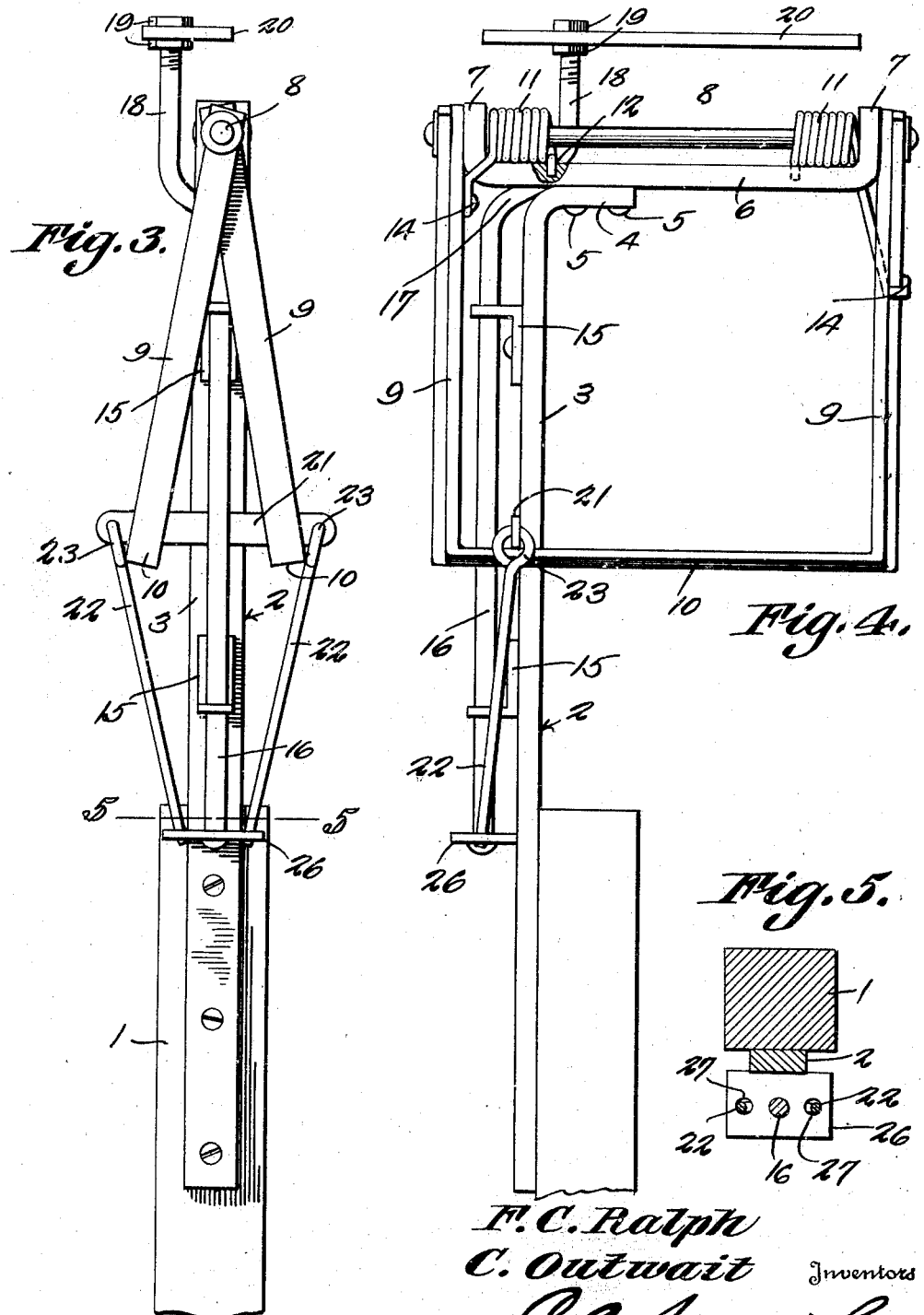

Patented Apr. 15, 1930

1,754,864

UNITED STATES PATENT OFFICE

FRED C. RALPH AND CHARLES OUTWAIT, OF ERIE, PENNSYLVANIA

BIRD TRAP

Application filed July 13, 1928. Serial No. 292,541.

This invention aims to provide a simple trap, adapted to be mounted on the upper end of a pole, or elsewhere, for the purpose of catching hawks, crows, and other birds of prey, novel means being provided for mounting the jaws of the trap, for closing the jaws of the trap, and for holding the jaws releasably in an open or set position.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

Figure 1 shows in side elevation, a trap constructed in accordance with the invention, the jaws being closed;

Figure 2 is an elevation wherein the trap is viewed at right angles to the showing of Figure 1, the jaws being closed;

Figure 3 is a side elevation wherein the jaws are set;

Figure 4 is an elevation wherein the trap is viewed at right angles to the showing of Figure 3, the jaws being set;

Figure 5 is a cross section on the line 5—5 of Figure 3.

The trap forming the subject matter of this application may be mounted on a support of any desired kind, such as a post or pole. The trap is made of metal throughout, and it includes a frame, denoted generally by the numeral 2, and of L-shape. The frame 2 includes a standard 3 secured at its lower end to the pole 1. The upper end of the standard 3 is horizontally disposed, as at 4, and is attached by securing elements 5 to a cross bar 6 having upstanding fingers 7 in which is mounted a pivot element 8.

The arms 9 of cooperating U-shaped jaws 10 are mounted to swing on the pivot element 8 outwardly of the fingers 7. Coiled springs 11 are disposed about the pivot element 8. The inner ends of the springs 11 are marked by the numeral 12 and are engaged with the cross bar 6 of the frame 2. The outer ends of the coiled springs 11 are designated by the numeral 14, and are attached, in any suitable way, to the arms 9 of the jaws 10.

Spaced guide brackets 15 are mounted on the standard 3. A trigger rod 16 is mounted for vertical sliding movement in the guide brackets 15. On the lower end of the trigger rod 16 there is secured a transverse keeper plate 26 having a plurality of openings or seats 27. The upper end of the trigger rod 16 is offset, as shown at 17, thereby to dispose the upper terminal 18 of the keeper rod 16 at one side of the cross bar and within the jaws 10 as they are opened and closed. By means of nuts 19, or otherwise, a horizontal trigger plate 20 is secured on the upper terminal 18 of the trigger rod 16. The trigger plate 20 is of such dimensions that the jaws 10 can open and close about it. A cross arm 21 is secured intermediate its ends to the standard 3 and constitutes a part of the frame 2. Latches 22, in the form of rods, are pivoted at one end, as shown at 23, to the ends of the cross arm.

When it is desired to set the trap, the jaws 10 are swung downwardly from the position of Figure 1 to the position of Figure 3, the springs 11 being put under added tension. The jaws 10 are extended below the cross arm 21. The latches 22 extend downwardly from the cross arm 21 and prevent the jaws 10 from swinging upwardly from the position of Figure 3 to the position of Figure 2. The trigger rod 16 is shoved upwardly, and the lower ends of the latches 22 are engaged in the openings 27 of the keeper plate 26 on the lower end of the trigger rod 16. The parts remain frictionally in the positions stated, until a bird lights on the trigger plate or perch 20. Then the weight of the animal causes the trigger rod 16 to slide downwardly in the guide brackets 15, the keeper plate 26 being disengaged from the lower ends of the latches 22. The latches, thereupon, swing upwardly from the positions shown in Figure 3, and the jaws can close together on the animal which is on the trigger plate 20.

What is claimed is:

A trap comprising a frame, spring-closed jaws pivoted to the frame, a trigger, means for mounting the trigger for right-line sliding movement on the frame, spaced latches between which the jaws are held when the jaws are swung downwardly to set position, means for pivotally mounting the upper ends of the latches pivotally on the frame, the trigger being provided at its lower end with seats wherein the lower ends of the latches are detachably received, and a perch on the upper end of the trigger and so located that an animal thereon will be caught by the jaws when the jaws close, the weight of the animal on the perch serving to move the trigger downwardly and disengage the seats from the latches.

In testimony that we claim the foregoing as our own, we have hereto affixed our signatures.

FRED C. RALPH.
CHARLES OUTWAIT.